(12) United States Patent
Graul et al.

(10) Patent No.: US 11,700,576 B2
(45) Date of Patent: Jul. 11, 2023

(54) METHOD FOR PUTTING ON STANDBY AND METHOD FOR REACTIVATING AT LEAST PART OF A WIRELESS COMMUNICATION NETWORK AND GATHERING NODE OF SAID NETWORK

(71) Applicant: SAGEMCOM BROADBAND SAS, Rueil Malmaison (FR)

(72) Inventors: Alexis Graul, Rueil Malmaison (FR); Florent Raby, Rueil Malmaison (FR); Farid Zaouia, Rueil Malmaison (FR)

(73) Assignee: SAGEMCOM BROADBAND SAS, Rueil-Malmaison (FR)

( * ) Notice: Subject to any disclaimer, the term of this patent is extended or adjusted under 35 U.S.C. 154(b) by 231 days.

(21) Appl. No.: 17/064,288

(22) Filed: Oct. 6, 2020

(65) Prior Publication Data
US 2021/0120485 A1 Apr. 22, 2021

(30) Foreign Application Priority Data
Oct. 18, 2019 (FR) .................................. 1911655

(51) Int. Cl.
*H04W 52/02* (2009.01)
*H04L 5/00* (2006.01)
*H04W 72/0453* (2023.01)
*H04W 84/04* (2009.01)

(52) U.S. Cl.
CPC ....... *H04W 52/0206* (2013.01); *H04L 5/0098* (2013.01); *H04W 72/0453* (2013.01); *H04W 84/045* (2013.01)

(58) Field of Classification Search
CPC ......... H04W 52/0206; H04W 72/0453; H04W 84/045; H04W 84/12; H04W 84/20; H04W 52/0216; H04W 52/0229; H04L 5/0098; Y02D 30/70
See application file for complete search history.

(56) References Cited

U.S. PATENT DOCUMENTS

| | | | |
|---|---|---|---|
| 2002/0089958 A1* | 7/2002 | Feder ........................ | H04L 9/40 370/340 |
| 2010/0097925 A1* | 4/2010 | Bell ........................ | H04L 45/00 370/219 |
| 2012/0320891 A1* | 12/2012 | Moeller ................ | H04W 4/021 370/338 |
| 2012/0322462 A1* | 12/2012 | Moeller ................ | H04W 4/027 455/456.1 |
| 2013/0078912 A1 | 3/2013 | San Vicente et al. | |

(Continued)

OTHER PUBLICATIONS

Jun. 23, 2020 Search Report issued in French Patent Application No. 1911655.

*Primary Examiner* — Wutchung Chu
(74) *Attorney, Agent, or Firm* — Oliff PLC; R. Brian Drozd

(57) ABSTRACT

A method for reactivating a wireless communication network in accordance with one of the IEEE 802.11 standards is described. The communication network includes a plurality of gathering nodes, each gathering node includes at least one access-point and/or user radio-frequency interface and/or a user of a so-called backhaul wireless network associated with the communication network, which are deactivated in sending mode, A beacon frame sent by a master node of the reactivation method is propagated gradually in order to reactivate all the nodes in the network.

18 Claims, 6 Drawing Sheets

(56) References Cited

U.S. PATENT DOCUMENTS

| | | | |
|---|---|---|---|
| 2013/0142136 A1* | 6/2013 | Pi | H04W 28/0289 |
| | | | 370/329 |
| 2015/0043554 A1* | 2/2015 | Meylan | H04W 88/06 |
| | | | 370/338 |
| 2015/0208348 A1 | 7/2015 | Kojima et al. | |
| 2016/0212679 A1* | 7/2016 | Wang | H04W 40/02 |
| 2016/0212755 A1* | 7/2016 | Cao | H04L 45/245 |
| 2017/0272273 A1* | 9/2017 | Singla | H04W 76/12 |
| 2017/0272317 A1* | 9/2017 | Singla | H04W 12/06 |
| 2017/0367040 A1 | 12/2017 | Sakai et al. | |
| 2018/0293478 A1* | 10/2018 | Cannell | G06K 19/0723 |
| 2019/0253836 A1* | 8/2019 | Sinha | H04W 8/18 |
| 2020/0344695 A1* | 10/2020 | Wang | H04W 52/0219 |
| 2022/0404814 A1* | 12/2022 | Kyburz | H04L 12/40169 |

* cited by examiner

METHOD FOR PUTTING ON STANDBY AND METHOD FOR REACTIVATING AT LEAST PART OF A WIRELESS COMMUNICATION NETWORK AND GATHERING NODE OF SAID NETWORK

TECHNICAL FIELD

At least one embodiment relates to the field of wireless communication networks in accordance with one of the IEEE (Institute of Electrical and Electronics Engineers) 802.11 standards, that is to say those wireless communication networks commonly referred to as Wi-Fi networks. At least one embodiment relates more particularly to a method for putting on standby and a method for reactivating at least part of such a network.

PRIOR ART

A wireless communication network (hereinafter "network") in accordance with one of the IEEE 802.11 standards typically comprises a plurality of nodes. Each node is an electronic device comprising at a minimum a radio-frequency module for establishing communications in accordance with one of the IEEE 802.11 standards, or in other words in accordance with one of the Wi-Fi standards. Such a network typically comprises an electronic device, commonly referred to as an access point or AP, and a plurality of so-called user (or client) electronic devices able to establish wireless connections with the access point and/or with each other. In a residential environment, the electronic device access point is typically a box supplied by an internet operator, that is to say a home gateway or residential gateway. User electronic devices are typically computers, televisions, tablets or so-called smartphones. It is thus commonly said that user electronic devices are associated "in Wi-Fi" with the access point. The architecture of a Wi-Fi network may also be distributed, in order for example to extend the range of the network or to increase the performances thereof, through the use of a plurality of access points. The architecture of a distributed Wi-Fi network is different from the previous architecture briefly described. A distributed Wi-Fi network comprises at a minimum two networks:
- a so-called gathering or infrastructure (backhaul) network, making it possible to connect the access points to each other and to form a network infrastructure in accordance with a network architecture of the mixed star and/or chain type, this backhaul network may be a wireless network (for example Wi-Fi), a cable network (for example Ethernet) or a mixture of the two,
- a so-called user (or client) Wi-Fi network (fronthaul) allowing a connection of so-called user (or client) nodes (or electronic devices) to the distributed Wi-Fi network.

In the backhaul network, a parent-child hierarchy is created between two connected Wi-Fi devices. One of the Wi-Fi devices becomes the parent of the other Wi-Fi device, the other Wi-Fi device becoming a child of the parent Wi-Fi device. The parent Wi-Fi device fulfils a role of access point for the child Wi-Fi device. The child Wi-Fi device fulfils a role of station for the parent Wi-Fi device.

FIG. 1 illustrates highly schematically such a distributed Wi-Fi network 100. The distributed network 100 comprises a gateway 110 and a plurality of nodes or electronic devices B1 101, B2 102, B3 103, B4 104, C1 105 and C2 106. The gateway 110 allows an interconnection of the network 100 with a network 120, for example the internet. In this example, the nodes B1, B2, B3 and B4 are so-called gathering nodes. These nodes B1, B2, B3 and B4 constitute the backhaul infrastructure of the network 100. The nodes C1 and C2 are two user nodes connected to gathering nodes (respectively the nodes B3 and B4). The gathering nodes B1, B2, B3 and B4 manage two Wi-Fi networks:
- a first Wi-Fi network, dedicated to gathering, allows an association of each gathering node with the distributed network 100, possibly in a meshed fashion,
- a second Wi-Fi network is dedicated to the association of the user nodes, in a similar fashion to a non-distributed Wi-Fi network.

Thus each node B1, B2, B3 and B4 of the infrastructure comprises a plurality of radio interfaces:
- a radio interface known as "AP-B" (standing for "access point backhaul") corresponding to a point-of-access interface of the Wi-Fi network dedicated to gathering,
- a radio interface known as "ST-B" (standing for "station backhaul") corresponding to a user (or client) interface of the Wi-Fi network dedicated to gathering,
- an "AP-F" radio interface (standing for "access point fronthaul") corresponding to an access-point interface of the Wi-Fi network dedicated to the association of user nodes of the distributed network 100.

In the example illustrated in FIG. 1, the node B1 101 is connected by cable to the gateway GW 110, for example via an Ethernet connection. According to one embodiment, the connection between the gateway GW 110 and the node B1 101 may be made by a Wi-Fi connection. According to a complementary embodiment, the gateway GW 110 and the node B1 101 are one and the same electronic device, said electronic device comprising the functionalities of the gateway GW 110 and of the node B1 101.

Each gathering node B1, B2, B3 or B4 can therefore possibly establish a connection to another gathering node in order to constitute the backhaul infrastructure of the distributing network 100. More precisely, a gathering node may, via the "ST-B" radio interface thereof, establish a connection to an "AP-B" radio interface of another gathering node in order to form a gathering-node chain. Some gathering nodes may be connected via a cable connection, for example of the Ethernet type.

An AP-B radio interface, an access point of the Wi-Fi network dedicated to gathering, establishes a Wi-Fi network associated with a network identifier SSID (service set identifier) corresponding to the backhaul network. A gathering node must therefore know this SSID in order to establish a Wi-Fi connection to another gathering node. A gathering node is adapted for retransmitting the traffic (that is to say the data, exchanged in messages) received via its access point fronthaul "AP-F" and access point backhaul "AP-B" radio interfaces to its station backhaul "ST-B" radio interface in order to transfer the traffic received to a central node of the distributed network, here the node B1 101. Likewise, a gathering node is adapted for redistributing the traffic received via its station backhaul "ST-B" radio interface to one or other or both of its access point fronthaul "AP-F" and/or access point backhaul "AP-B" radio interfaces. In other words, in the example illustrated in FIG. 1, the gathering node B3 103 is adapted for:
- receiving traffic gathered by the node B4 101 via its radio interface AP-B,
- receiving traffic from connected user nodes, for example the user nodes C1 105, via its AP-F interface, retransmitting said traffic received to the gathering node B1 101 via its station backhaul ST-B radio interface, and conversely, redirecting traffic received via its station backhaul ST-B radio interface to the node B4 104 via its AP-B interface and/or the gathering node B1 101 via its station backhaul ST-B radio interface.

The nodes of the backhaul network thus communicate with each other by means of logic links, for example IP communications or encrypted tunnels or communications in accordance with a proprietary communication protocol.

Such a network broadcasts numerous electromagnetic signals and is also a high consumer of energy. Consequently putting all or part of the network on standby is known. Being able to reactivate the network or the network part put on standby is also known.

Thus the patent application US 2010/0195551 describes a method for putting on standby a mesh wireless communication network wherein a master node sends directly, or through relays, to slave nodes, an instruction to go on standby (or sleep instruction). This method is associated with the implementation in each slave node of an intermittent reception function making it possible to receive a reactivation (or reawakening) instruction coming directly or indirectly from the master node. However, the methods described are not compatible with the CSMA-CA protocol used by the 802.11 standards. This is because this protocol does not make it possible to know the actual instants of sending of the frames. Moreover, the methods described do not make it possible to put the network on standby or reactivate it from just any node in the network. It is therefore necessary to propose methods for overcoming these drawbacks.

DISCLOSURE OF THE INVENTION

According to a particular embodiment, a method for reactivating a wireless communication network in accordance with one of the IEEE 802.11 standards is described. The network comprises a plurality of gathering nodes organised in a parent/child hierarchy, at least one gathering node in said communication network, referred to as the current node, comprising an access-point and/or user radio-frequency interface of a so-called backhaul wireless network associated with the communication network that are deactivated in sending mode. The method is executed by said current node and comprises;

receiving a first beacon frame comprising state information indicating a reactivation; and a) putting in memory state information on said current node in order to indicate that a reactivation is under way;

b) reactivating all the backhaul radio-frequency interfaces of said current node;

c) broadcasting a second beacon frame comprising state information indicating a reactivation;

d) pairing with a parent node and, in the case where said current node has child nodes, waiting until said child nodes pair with it and checking that said child nodes are reactivated; updating an internal state indicating that said current node is reactivated. According to a particular embodiment, the current node further comprising an access-point radio-frequency interface of a wireless network known as a fronthaul network associated with the communication network that is deactivated in sending mode and in reception mode, the method comprises, after the step b), a step of reactivating said access-point radio-frequency interface of said fronthaul network in sending mode and in reception mode.

According to a particular embodiment, said first beacon frame further comprises timestamp information corresponding to the time at which said reactivation was triggered, said steps a) to d) being performed solely in the case where a value of said timestamp information received is higher than a value of current timestamp information associated with said current node.

According to a particular embodiment, the step a) further comprises the putting in memory of the timestamp information received in place of the value of the current timestamp information.

According to a particular embodiment, said second beacon frame further comprises the timestamp information received.

According to a particular embodiment, said first beacon frame further comprising a key identifying said network, said steps a) to d) are performed solely in the case where said key identifying said network of said beacon frame is identical to an identification key stored in memory of said current node.

According to a particular embodiment, said reactivation is triggered by pressing on a button of said master node.

According to a particular embodiment, said network being reactivated, the method comprises, for a node of said network referred to as a receiving node:

1) Receiving a message from a node in the network, referred to as a requesting node, comprising a standby request; and if said receiving node is a node not having any adjacent node other than said requesting node:

2) Sending a message to said requesting node indicating that it accepts the standby request;

3) Receiving a message comprising a standby instruction;

4) Sending a message to said requesting node acknowledging the standby instruction;

5) Going on standby while storing in memory connection information and deactivating in sending mode its access-point and/or user radio-frequency interfaces of said backhaul network;

otherwise:

Sending a message to said requesting node indicating that it refuses the standby request and an indication that it is an intermediate node;

Repeating the steps 1) to 5) recursively for each of the nodes adjacent to said receiving node distinct from said requesting node with said receiving node acting as a new requesting node, until all the nodes adjacent to said receiving node are put on standby;

Sending a message to said requesting node comprising a request for enabling standby;

Receiving a message comprising a standby instruction;

Sending a message to said requesting node acknowledging the standby instruction;

Going on standby while storing in memory connection information and deactivating in sending mode its access-point and/or user radio-frequency interfaces of said backhaul network.

According to a particular embodiment, going on standby further comprises deactivating its access-point radio-frequency interface of the fronthaul network in sending mode and in reception mode.

According to a particular embodiment, the message comprising the standby request comprises information indicating that it is a standby request and an identifier of the requesting node.

According to a particular embodiment, the message comprising the standby request further comprises an identification key particular to said network.

According to a particular embodiment, the message comprising the standby instruction comprises information indicating that it is a standby instruction and an identifier of the node sending the message.

According to a particular embodiment, the message comprising the standby instruction further comprises a time value defining an instant at which said receiving node must go on standby.

According to a particular embodiment, the message comprising the standby instruction further comprises the identification key particular to said network of said standby request.

According to a particular embodiment, the message comprising the standby instruction further comprises an identifier of a channel on which the radio interfaces of said receiving node must reactivate themselves.

According to a particular embodiment, the message comprising the standby-enabling request comprises information indicating that it is a standby-enabling request and an identifier of said node sending said message.

According to a particular embodiment, a gathering node of a wireless communication network in accordance with one of the IEEE 802.11 standards is described. The gathering node comprises an access-point and/or user radio-frequency interface of a so-called backhaul wireless network associated with the communication network which are deactivated in sending mode. The gathering node is configured to execute the steps of the method described above according to any one of the embodiments. According to a particular embodiment, a computer program is described. The computer program comprises instructions for implementing, by a processor of a gathering node of a distributed wireless communication network comprising a plurality of gathering nodes, the method described previously according to any one of the embodiments, when the computer program is executed by the processor. According to a particular embodiment, a recording medium is described. The recording medium can be read by a management node of a distributed wireless communication network, on which the computer program described above is stored.

BRIEF DESCRIPTION OF THE DRAWINGS

The features mentioned above, as well as others, will emerge more clearly from a reading of the following description of an example embodiment, said description being made in relation to the accompanying drawings, among which.

DETAILED DISCLOSURE OF EMBODIMENTS

At least one embodiment makes it possible to put on standby a distributed wireless communication network in accordance with one of the IEEE 802.11 standards or a part of such a network. This putting on standby being able to be triggered, e.g. by a user, from any node in the network.

Figure 1:
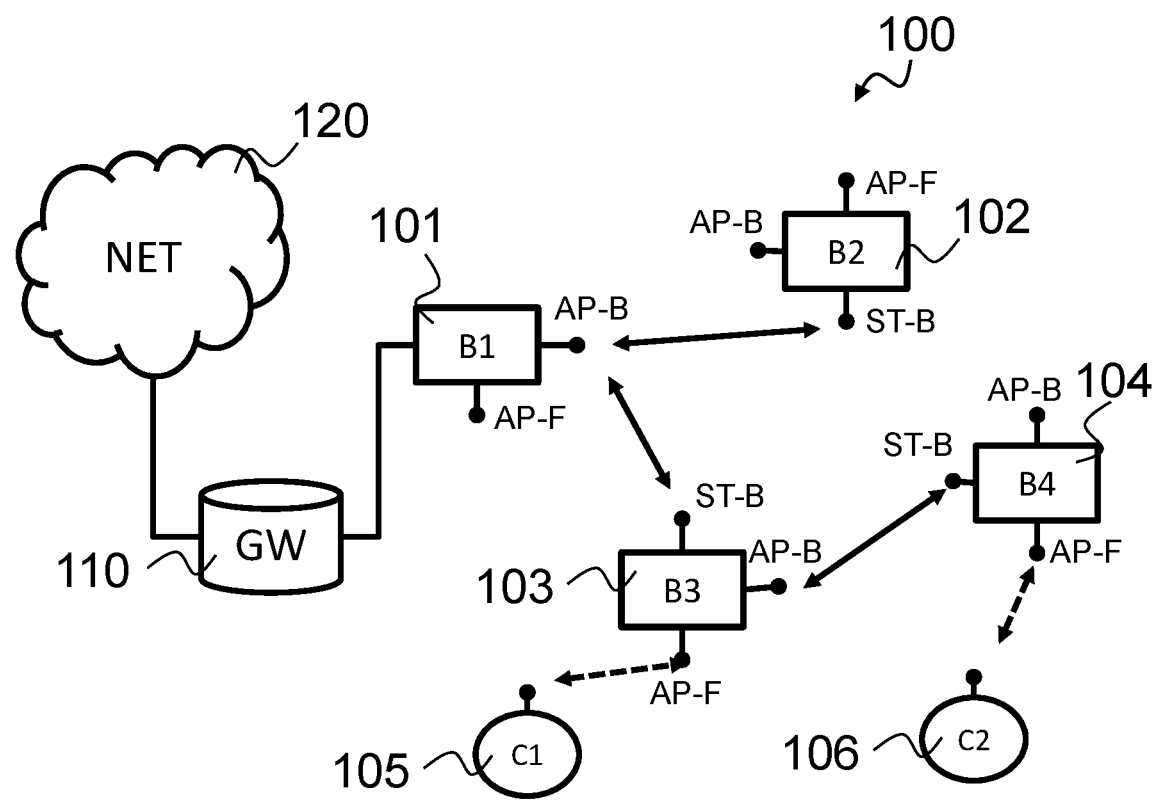
FIG. 1 illustrates schematically the architecture of a distributed wireless communication network comprising a plurality of nodes, for example in accordance with an IEEE 802.11 standard.
Figure 2:
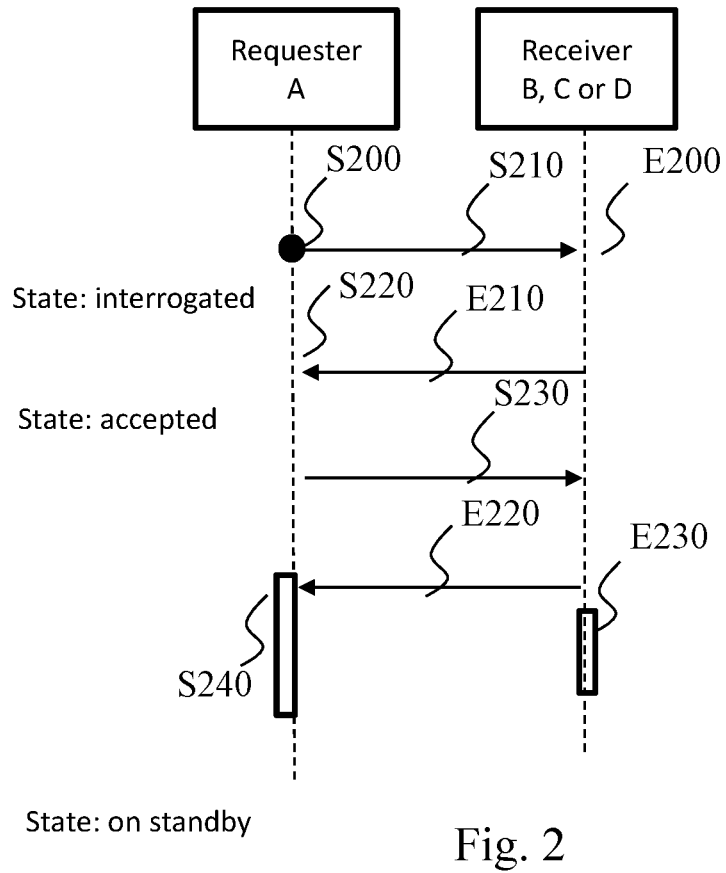
FIG. 2 illustrates schematically a method for putting on standby a distributed wireless communication network in accordance with one of the IEEE 802.11 standards according to a particular embodiment.
Figure 4:
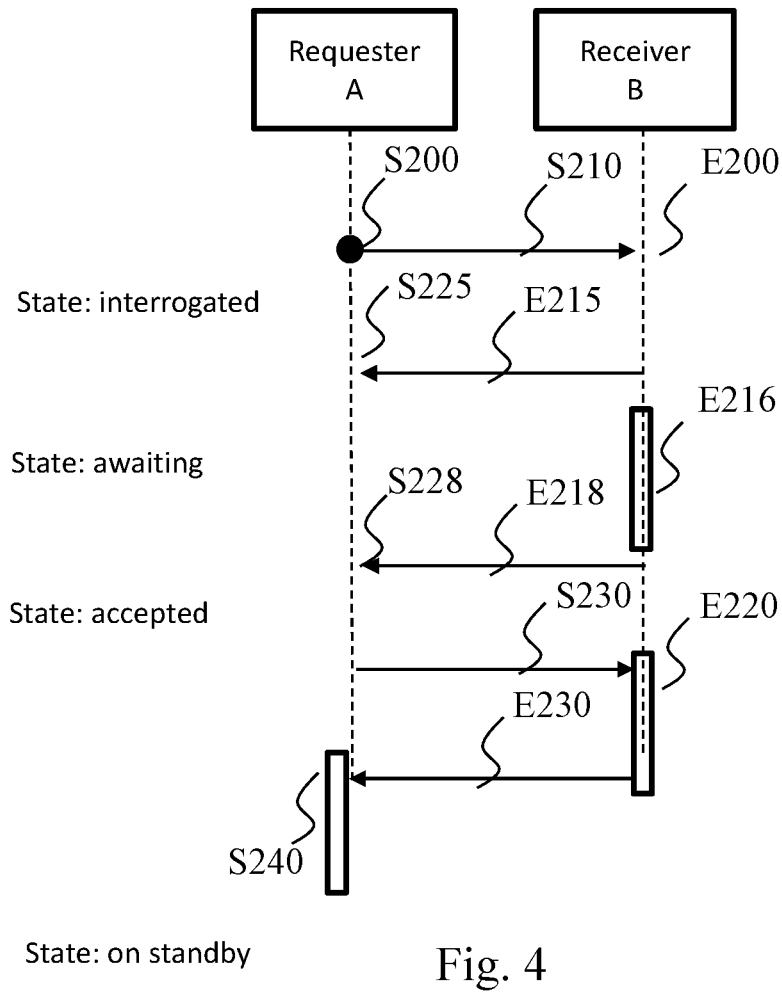
FIG. 4 illustrates schematically a method for putting on standby a distributed wireless communication network in accordance with one of the IEEE 802.11 standards according to another particular embodiment.

At least one embodiment makes it possible to reactivate a distributed wireless communication network in accordance with one of the IEEE 802.11 standards (or respectively a part of such a network) which has previously been put on standby. This reactivation being able to be triggered, e.g. by a user, from any node in the network. FIGS. 2 and 4 illustrate schematically a method for putting on standby a distributed wireless communication network in accordance with one of the IEEE 802.11 standards, for example the network 100, or a part of this network. In the remainder of the document, a node is considered to be a "requesting node" if it makes a standby request to another node. A node is considered to be a "receiving node" if it receives a standby request coming from a requesting node.

In FIGS. 2 and 4, the steps performed in a requesting node are identified by the letter S and the steps performed in a receiving node are identified by the letter E. FIG. 2 illustrates more particularly the standby method in the case where the node receiving the standby request is a node not having adjacent nodes other than the requesting node. This is the case with the nodes B, C or D in FIG. 3. In this figure, the node A is the requesting node. The method is described with the node A as the requesting node and the node B as the receiving node. In the case of a plurality of adjacent nodes, the method described is implemented with each of the nodes adjacent to the requesting node, in this case the nodes B, C and D in FIG. 3.

During the standby method, the requesting node A stores in memory information representing the state of the standby method in relation to the receiving node among the following states:

Ready: default state, the node is switched on and ready to interact in the case of the standby method;

Interrogated: the standby request has been sent, the receiving node has therefore been interrogated and the requesting node is awaiting a response;

Accepted: the standby request has been accepted by the receiving node;

Refused: the standby request has been refused by the receiving node;

Awaiting: the receiving node must send a response to the requesting node;

Cancelled: the standby procedure is cancelled; and

On standby: the receiving node is on standby.

During a step S200, the requesting node A of the wireless communication network detects a triggering by a user of a putting of the network on standby. The requesting node A may be any node in the wireless communication network. The triggering of the standby may be done by a user by pressing on a physical button of the requesting node A. According to a variant, the triggering of the standby is performed by a user via a user interface attached to the requesting node. The requesting node will then start the standby method.

During a step S210, the requesting node sends in unicast mode, to an adjacent node B, then considered to be a receiving node, a message M1 comprising a standby request. It also changes the state of the standby method in relation to the receiving node into "interrogated". The adjacent nodes are the nodes in the backhaul network adjacent to the requesting node, i.e. accessible from the requesting node in a single hop. The message is for example transmitted by means of a communication bus through a cable link or a wireless link (e.g. Wi-Fi or Bluetooth).

The message M1 comprises:

information for defining the message category (here a standby request). This information may be a numerical identifier for defining the category of the message among a set of message categories;

an identifier of the node A sending the message (identifying in the topology e.g. its MAC address);

optionally, a key identifying the network making it possible to identify the latter. This key is for example generated randomly by the node that initiated the putting of the network on standby, i.e. the node from which the standby was triggered. This makes it possible to immunise the network against pirate reactivation. Optionally the key could serve to encrypt the messages exchanged; and optionally, a list of the identifiers of the nodes through which the request passed. This list makes it possible to know the topology of the network from the node originating the initial standby request. This is because the putting on standby propagates recursively from a node originating the initial request to ends of branches.

During a step E200, the receiving node B receives the message M1 comprising the request to put the network on standby. On receiving the standby request, the receiving node B can accept or refuse the request and where applicable indicate the reason for refusal. In FIG. 2, the receiving node B accepts the standby request.

In a step E210, the receiving node B therefore sends a message M2 to the requesting node A identified in the message M1, said message indicating that the receiving node accepts the standby request. The message M2 comprises:

Information for defining the message category (here response to a standby request). This information may be a numerical identifier for defining the category of the message among a set of message categories;

An identifier of the node B sending the message (identifying in the topology e.g. its MAC address);

A response to the message M1: acceptance of the standby request; and

Optionally, a list of its adjacent nodes. This information enables the node A to have a view of the nodes adjacent to the node B. This information makes it possible in particular to complete the topological view of the system and to give to the node A a preview of propagation downstream through the knowledge of the nodes adjacent to the node B.

In a step S220, the requesting node A receives the response, i.e. the message M2, sent by the receiving node B. In the case of a plurality of adjacent nodes, messages are received by all its adjacent nodes. On receiving a response (message M2) and if the request is accepted, the requesting node A will change the state of the method associated with the receiving node into "accepted" and will send a standby instruction. The request having been accepted, the requesting node A, in a step S230, sends to the receiving node B a message M3 comprising a standby instruction.

The message M3 comprises:

Information for defining the message category (here standby instruction). This information may be a numerical identifier for defining the category of the message among a set of message categories;

An identifier of the node sending the message (identifier in the topology, MAC address);

Optionally a time value for defining the instant when the nodes must go on standby. If the value is zero then the standby is immediate. If this value is not present in the message M3, it is supposed to have a value defined by default, e.g. a zero value;

Optionally, information identifying a so-called "reactivation" channel that will be used by all the nodes in order to detect therein an activity leading to a reactivation/reawakening of the system. This channel may be the current channel used before putting on standby or be different. However, if the current channel is a DFS channel, the node initiating the standby request must choose a non-DFS channel. It may select the least busy channel before putting on standby or take a default channel;

Optionally, the key identifying the network defined in the message M1 if such is present; and Optionally, the list of identifiers of the nodes through which the request passed.

During a step E220, the receiving node B receives the message M3 comprising the standby instruction and in return sends a message acknowledging the standby instruction.

In a step E230, the receiving node B goes on standby.

If the time value defined in the message M3 comprising the standby instruction is equal to zero, the node goes on standby immediately. Otherwise it does so in a deferred manner. Thus, if the time value defined in M3 is a period, the node goes on standby after the period indicated in M3 has elapsed. When the receiving node B goes on standby, it performs the following actions:

It saves the connection information (BSSID, SSID, password) in order to be able to subsequently reconnect to the network and to keep the same topology as before the standby. Optionally, it saves the key identifying the network and data for identifying the channel, e.g. a channel number identifying a frequency band, used before the standby. The latter information will for example be able to be used during arbitrations by a management node, following a reactivation of the system on the reactivation channel, in order to switch all the nodes in the backhaul network onto a more appropriate channel; and It deactivates its AP-B and ST-B radio interfaces solely in sending mode, these remaining active in reception mode. The deactivation of the AP-B and ST-B radio interfaces allows deactivation of the AP-F radio interfaces in sending mode and in reception mode. This is because, as soon as the AP-B and ST-B radio interfaces are deactivated, no more information is exchanged through the AP-F radio interfaces. In a variant, the AP-F radio interfaces are left active. This variant makes it possible to detect an activity of a mobile terminal, e.g. a telephone that is switched on again, and to trigger a reactivation of the system from this detection. Optionally, before or after the putting on standby, it also configures the channel by applying the one, i.e. the "reactivation" channel, that is indicated in the message M3 comprising the standby instruction. Thus the receiving node B will listen out on this reactivation channel in order to detect thereon any reactivation instructions.

Figure 3:
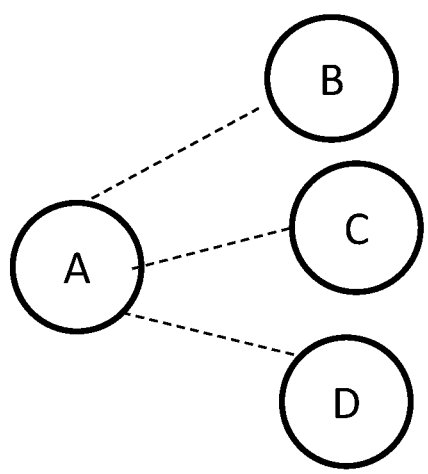
FIG. 3 shows a node A requesting and nodes B, C and D receiving a standby request.

In a step S240, the requesting node receives the acknowledgement message. This acknowledgement enables the requesting node, i.e. the one that sent the standby instruction, to go on standby in its turn. In the case of a plurality of adjacent nodes, as illustrated in FIG. 3, the requesting node goes on standby when it has received the acknowledgement messages from all the receiving nodes B, C and D. Optionally, the requesting node, if it is capable of operating on the same frequencies as the receiving node B, analyses its radio environment in order to check that the receiving node has indeed stopped transmitting and has therefore gone on standby. The requesting node A can then change the state of the method associated with the receiving node "on standby".

Figure 5:
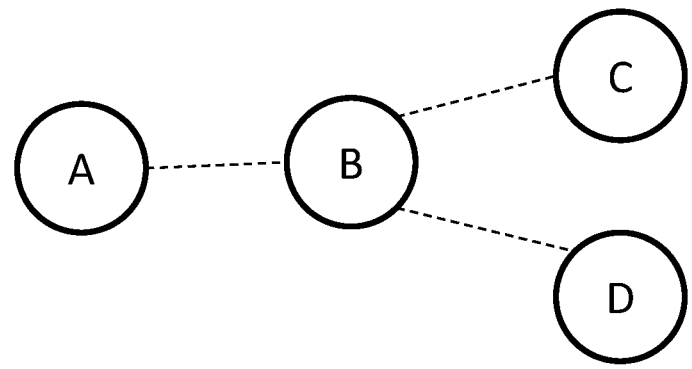
FIG. 5 shows a node A requesting and nodes B, C and D receiving a standby request, said node B being an intermediate node.

FIG. 4 illustrates the standby method wherein the node B receiving the standby request is an intermediate node, i.e. a node that is not situated at the end of a chain and which therefore itself has adjacent nodes C and D other than the requesting node, as illustrated in FIG. 5. In this figure, A is the requesting node. The node A sends a standby request to the node B. In this case, the node B will refuse the standby request since it is a node intermediate between the node A and the nodes C and D. The node B will then in its turn initiate a standby request to its own adjacent nodes (C and D) in accordance with the method described above with reference to FIG. 2.

In a step S200, the requesting node A of the wireless communication network detects a triggering of a putting of the network on standby, e.g. by a user. The requesting node A may be any node in the wireless communication network. The triggering of the standby may be done by a user by pressing on a physical button of the requesting node. According to a variant, the triggering of the standby is performed by a user via a user interface attached to the requesting node. The requesting node will then start the standby method. In a step S210, the requesting node sends, in unicast mode, to an adjacent node, in this case the node B in FIG. 5, a message M1 comprising a standby request. It also changes the state of the standby method in relation to the receiving node B into "interrogated" mode. In the case of a plurality of adjacent nodes, the message M1 is sent to all its adjacent nodes. The message is for example transmitted by means of a communication bus through a cable link or a wireless link (e.g. Wi-Fi or Bluetooth).

In a step E200, the receiving node B receive the message M1 comprising the request to put the network on standby.

In a step E215, the receiving node B sends a message M2 to the requesting node A, said message M2 indicating that it refuses the standby request. The message M2 comprises:

Information for defining the message category (here response to a standby request). This information may be a numerical identifier for defining the category of the message among a set of message categories;

A response to the message M1: refused;

A reason for the refusal: intermediate node; and

Optionally, the list of its adjacent nodes.

This is because the node B, being an intermediate node, must first ensure that all its adjacent nodes are on standby before accepting a standby request.

In a step S225, the requesting node A receives the response sent by the receiving node B. If the request is refused, the reason for the refusal is analysed. In the case where the reason is "intermediate node", the requesting node will then change the state of the method in relation to the receiving node into "on standby".

In a step E216, the intermediate receiving node triggers the standby method for its adjacent nodes apart from the requesting node, in this case for the nodes C and D in FIG. 5. The steps in FIG. 4 are therefore implemented with the node B as the requesting node and the node C or D as the receiving node. In this case, in the step S200, the triggering of the standby for the node B is detected not by a user but by the reception of the message M1 comprising the standby request coming from the node A. The steps of the standby method are therefore applied recursively.

In a step E218, once the nodes C and D are on standby, the intermediate receiving node B sends to the requesting node A a message M4 comprising a request to enable standby.

The message M4 comprises:

Information for defining the category of message (here a request to enable standby). This information may be a numerical identifier for defining the message category among a set of message categories; and An identifier of the node B sending the message (identifier in the topology, e.g. its MAC address).

In a step S228, requesting node A receives the message M4 comprising the request for enabling standby.

In a step S230, the requesting node sends a message M3 comprising a standby instruction. It changes the state associated with the node B into "accepted".

In a step E220, the receiving node receives the message M3 comprising the standby instruction and goes on standby.

In a step E230, the receiving node B sends a message acknowledging the standby instruction.

In a step S240, the requesting node receives the acknowledgement message. This acknowledgement enables the requesting node, i.e. the one that sent the standby instruction, to go on standby in its turn. In the case of a plurality of adjacent nodes, as illustrated in FIG. 3, the requesting node goes on standby when it has received the acknowledgement messages from all the receiving nodes B, C and D. Optionally, the requesting node, if it is capable of operating on the same frequencies as the receiving node B, analyses its radio environment in order to check that the receiving node has indeed stopped transmitting and has therefore gone on standby. The requesting node A can then change the state of the method associated with the receiving node into "on standby".

Naturally, if one of the nodes C or D itself has adjacent nodes, the method described in relation to FIG. 4 is applied with the node C or D as the requesting node and its adjacent nodes as receiving nodes. Thus, gradually, the whole of the wireless communication network is put on standby.

In a particular embodiment (not shown in FIGS. 2 and 4), the standby request may be refused by a receiving node for type of reason other than being "intermediate node". In a variant, a receiving node may not respond to a standby request since it is not joinable, for example because it is switched off or disturbed. In all these cases (i.e. refusal for a type of reason other than being "intermediate node" or absence of response), the requesting node will change in memory the state of the standby method relating to the receiving node into "refused". This is because a receiving node may be non-joinable. Because of this, it cannot be informed of the putting of the network on standby. In this particular case, the standby procedure is cancelled. The requesting node informs the other nodes of the stoppage of the standby procedure. Where applicable, it may request the nodes already put on standby to reactivate, e.g. by using the method described with reference to FIGS. 6 and 7. The nodes that have received the request to cancel the standby have their states configured to "cancelled" at the requesting node. The nodes that are not yet put on standby receive a cancellation request and apply the same procedure recursively. The cancellation request must be acknowledged. On reception of the acknowledgement, the requesting node changes its state and configures it to "ready".

In a particular embodiment, beacon frames may be broadcast in order to inform all the nodes in the wireless communication network that the latter is in the process of being put on standby. More precisely, the node from which the standby was triggered adds, in at least one beacon frame, information (IE) indicating that the network is in the process of being put on standby. In a variant, this node adds, in at least one beacon frame, information (IE) indicating the state of the standby method, i.e. whether it is under way, terminated, cancelled, etc.

The method according to at least one embodiment advantageously makes it possible to put at least part of the network on standby and therefore to save on energy and to limit the unnecessary broadcasting of electromagnetic signals. Moreover, this standby can be triggered from any node in the network.

Figure 6:
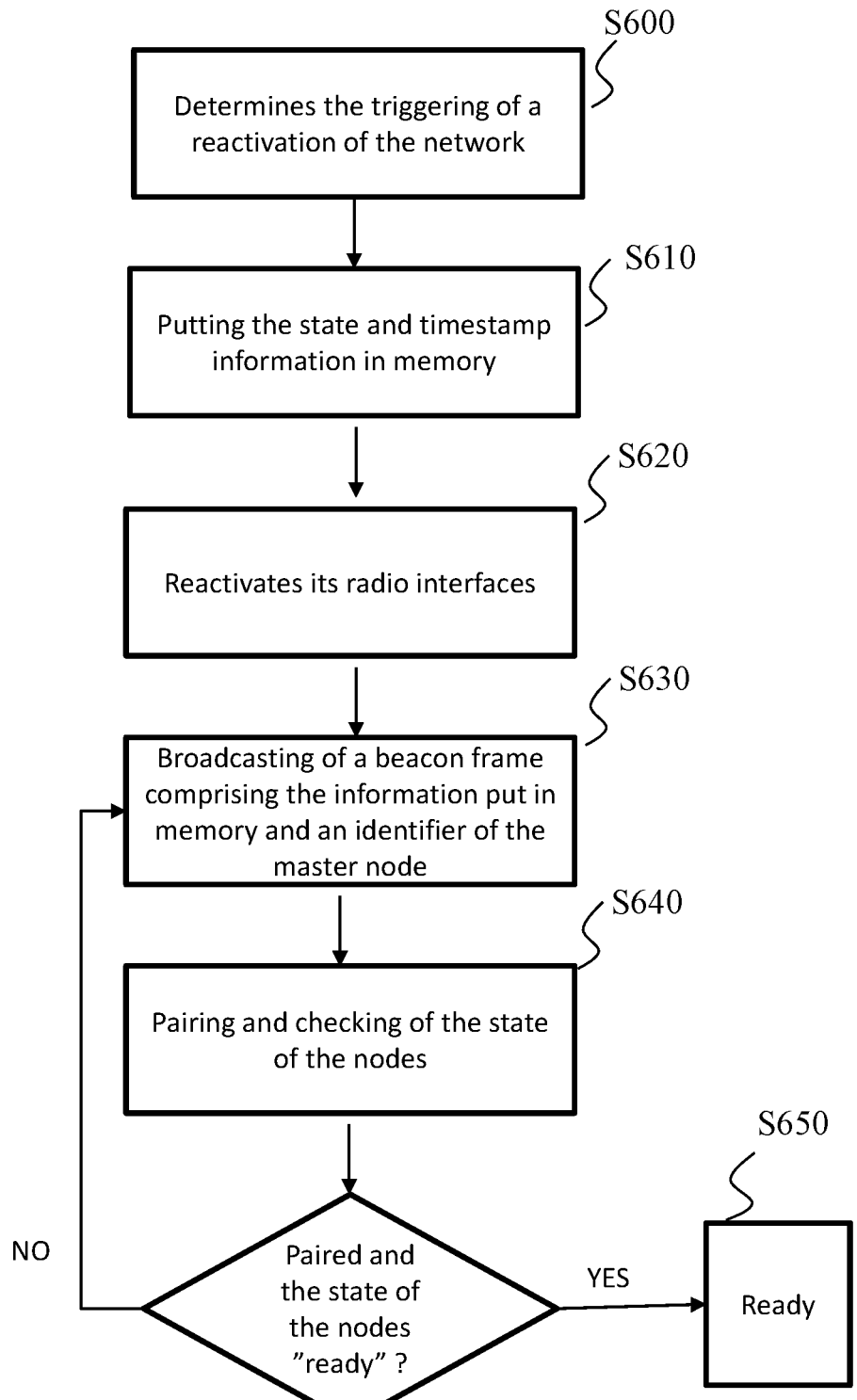
FIG. 6 illustrates schematically a method for reactivating a distributed wireless communication network in accordance with one of the IEEE 802.11 standards according to a particular embodiment.
Figure 7:
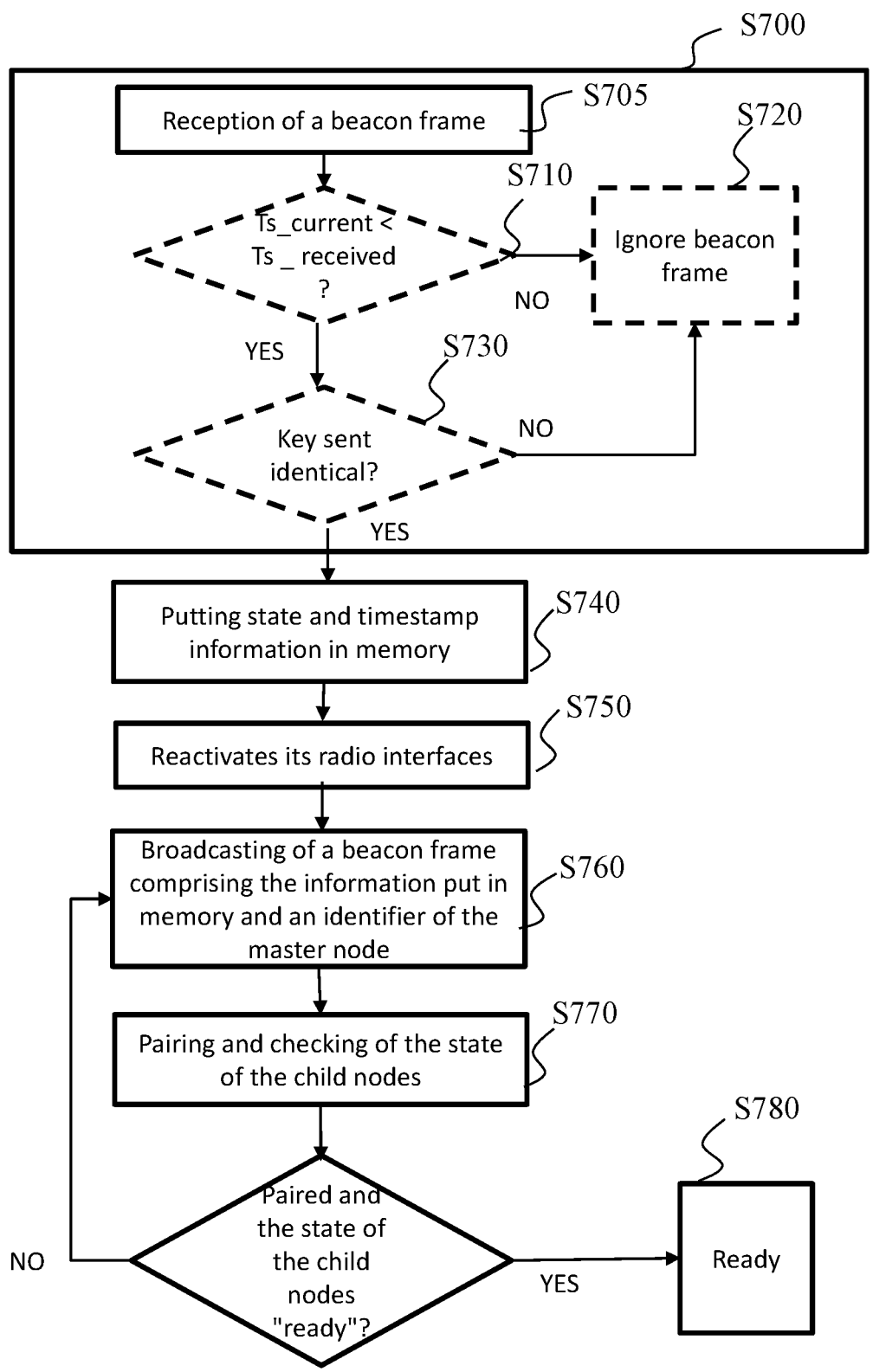
FIG. 7 illustrates schematically a method for reactivating a distributed wireless communication network in accordance with one of the IEEE 802.11 standards according to another particular embodiment.

FIGS. 6 and 7 illustrate schematically a method for reactivating a distributed wireless communication network in accordance with one of the IEEE 802.11 standards, for example the network 100, said wireless communication network comprising a plurality of gathering nodes, some of which at least are on standby. The nodes have been able to be put on standby via the method described with reference to FIGS. 2 and 4 or by any other method allowing a standby resulting in a deactivation of the "AP-B" and "ST-B" backhaul radio interfaces solely in sending mode, these remaining active in reception mode. In a variant, the deactivation of the "AP-B" and "ST-B" backhaul radio interfaces in sending mode was followed by a deactivation of the "AP-F" radio interfaces in sending mode and in reception mode. The connection information (e.g. basic service set identifier, SSID and password), optionally the identification key and the channel used before the standby will also have been saved in memory during the standby procedure. More particularly, FIG. 6 illustrates the method from the point of view of a so-called master node, from which the method for reactivating the network is triggered, and FIG. 7 illustrates the method from the point of view of another node in the network.

With reference to FIG. 6, in a step S600, a node in the wireless communication network determines that a reactivation of the wireless communication network has been triggered by a user. This node may be any node in the wireless communication network. The reactivation may be triggered by a user by pressing on a physical button of the node. According to a variant, the reactivation is triggered by a user via a user interface attached to the node. The node will then start the reactivation method and becomes the master node of the reactivation method.

In a step S610, the master node puts in memory the information useful to the reactivation of the network. In particular it stores in memory: its internal state that it configures to "reactivation" and timestamp information so that it is equal to the time of the triggering by the user of the reactivation. The internal state of the node gives an indication on the phase in which it is situated in the reactivation method. The "reactivation" state indicates that it is in the process of reactivation and the "ready" state indicates that it is reactivated and that it can therefore receive and transmit data via its radio interfaces in the same way as before the standby.

In a step S620, the master node reactivates all its radio interfaces. In particular, it reactivates its "AP-F" radio interfaces in sending mode and in reception mode and its "AP-B" and "ST-B" backhaul radio interfaces in sending mode. In a variant embodiment, the master node reactivates only its "AP-B" and "ST-B" backhaul radio interfaces in sending mode. In this variant, its "AP-F" radio interfaces are reactivated in sending mode and in reception mode later, e.g. at the end of the step S650. The reactivation channel is used optionally during the reactivation of the system. If, during the reactivation, the reactivation channel is in service, it will continue to be used during the use of the network. This channel may be different from the channel used prior to the standby. In a variant embodiment, the master node, in S620, configures the channel used by its backhaul radio interfaces on the channel defined before standby. In a step S630, the master node broadcasts, to all the nodes in the network, a message indicating to them to reactivate. This is because the "AP-B" and "ST-B" radio interfaces of the nodes are active in reception mode during the period of standby of the network. Thus the nodes within range of the master node remain configured to receive and read the messages broadcast by the master node.

For this purpose, the master node adds, in its beacon frames, information IE ("information element") comprising in particular the information useful to the reactivation of the network put in memory at the step S610, i.e. its internal state configured to "reactivation" and optionally timestamp information corresponding to the time of triggering by the user of the reactivation. The IE optionally comprises an identifier of the master node, e.g. its MAC address, and an identification key negotiated before the network was put on standby in order to identify the master node as indeed belonging to the network. The identification key may also be used as a hash key in order to encrypt these data in order to ward off any attacks.

In a step S640, the master node pairs with the node that was its "parent" before the standby. It checks that all its child nodes are paired with it and that the state of all the nodes in the network is configured at "ready". If such is the case, then the master node can in its turn configure as "ready" in a step S650. The "master" node is the last node going to the "ready" state, which indicates that the reactivation method is terminated and that the network is functioning in the same way as before the standby.

In a variant, the master node sends a message over the whole of the network that must be acknowledged in cascade in the same way as for the standby request in order to check that all the nodes are indeed reactivated. For example, with reference to FIG. 5, supposing that A is the master node, it then sends to B a verification message, and B transmits the message to C and to D. Once C and D have responded to B, B responds to A in order to confirm that its child nodes are reactivated.

With reference to FIG. 7, in a step S700, a node in the wireless communication network, referred to as the current node, determines that a reactivation of the wireless communication network has been triggered. For a current node different from the master node, the step S700 (which corresponds to the step S600 for the master node) comprises the steps S705 to S730.

In a step S705, the current node receives a beacon frame sent by the master node or relayed by another node in the network.

In an optional step S710, the current node compares the timestamp information Ts_received received in the beacon frame with its own timestamp information Ts_current in order to check whether it is indeed a new event. If Ts_received is higher than Ts_current, the current node checks the state indicated in the IE of the beacon frame received. In the contrary case, it will consider that the beacon frame comprises obsolete information and will ignore the beacon frame in a step S720.

If the state in the IE indicates "reactivation", the current node checks, in an optional step S730, whether the identification key negotiated before the standby and stored in its memory is identical to the key indicated in the beacon frame received. If such is the case, it will relay the reactivation information (state, timestamp information, identification of the master node, optionally identification key) to the other nodes. For this purpose, in a step S740, the current node puts in memory the information useful to the reactivation of the network. This is done using the IE of the beacon frame received. In particular, it stores in memory its internal state by configuring it at "reactivation". Optionally, it stores the value of Ts_received, which replaces the value Ts_current, and other data such as the identifier of the master node indicated in the IE. In a step S750, the current node reactivates all its radio interfaces. In particular, it reactivates its "AP-F" radio interfaces in sending mode and in reception mode and its "AP-B" and "ST-B" backhaul radio interfaces in sending mode. In a variant, the current node reactivates only its "AP-B" and "ST-B" backhaul radio interfaces in sending mode. In this variant, its "AP-F" radio interfaces are reactivated in sending mode and in reception mode later, e.g. at the end of the step S780. The reactivation channel is used optionally at the time of reactivation of the system. If, at the time of reactivation, the reactivation channel is in service, it will continue to be used during the use of the network. In a variant, it configures the channel used by its backhaul radio interfaces on the channel defined before standby.

In a step S760, the current node broadcasts the beacon frames comprising information IE ("information element") with the information useful to the reactivation of the network put in memory at the step S740, i.e. its internal state configured at "reactivation", the timestamp information corresponding to the time of the triggering by the user of the reactivation and the identifier of the master node. The IE optionally comprises the identification key negotiated before the network was put on standby in order to identify the current node as indeed belonging to the network. Thus, gradually, the information appearing in the beacon frame of the master node is relayed by other nodes in the network. In a variant, the current node adds its own identifier, e.g. its MAC address, in the IE. Thus it is possible to know through which nodes the reactivation information passed.

In a step S770, having knowledge of its close topology, the current node will pair with the node that was its "parent" before the standby. This is because the node, like any Wi-Fi equipment, has knowledge of and therefore has in memory, independently of its operating state, the list of the stations (child nodes) that are associated on its AP-B interface and the access point (parent node) on which its ST-B interface is associated.

If the current node did not have any child nodes before it was put on standby, after pairing with its parent node it configures its internal state to "ready" and updates its own timestamp information in order to indicate therein the time of its change of state in a step S780.

If the current node had child nodes before it was put on standby, it waits until all its child nodes are paired with it. Optionally, it checks by means of a scanning of its radio environment that their internal state is indeed configured at "ready". If such is the case, then the current node, after pairing with its parent node, in its turn configures its internal state at "ready" and updates its own timestamp information in order to indicate therein the time of its change of state in the step S780. Thus it in this way indicates that the reactivation method is completed for its branch.

In the particular case of a topology in a loop, the nodes having knowledge of the topology change their internal state to "ready" once all their "child" nodes have paired and are themselves associated with their "parent" nodes. All the nodes then periodically scan their radio environment in order to check whether each beacon frame sent by the nodes in the network does indeed contain the "ready" state. Once only the "ready" state is broadcast, the reactivation method is terminated. This approach can also be used in the context of a star topology and a branch topology.

The methods for putting on standby and reactivating the distributed wireless communication network can be implemented independently. Thus the wireless communication network put on standby by the method described with reference to the steps in FIGS. 2 to 5 can be reactivated by the method described with reference to FIGS. 6 and 7 or by a different method. In the same way, the wireless communication network reactivated by the method described with reference to FIGS. 6 and 7 may have been put on standby previously by the method described with reference to FIGS. 2 to 5 or by a different method.

Figure 8:
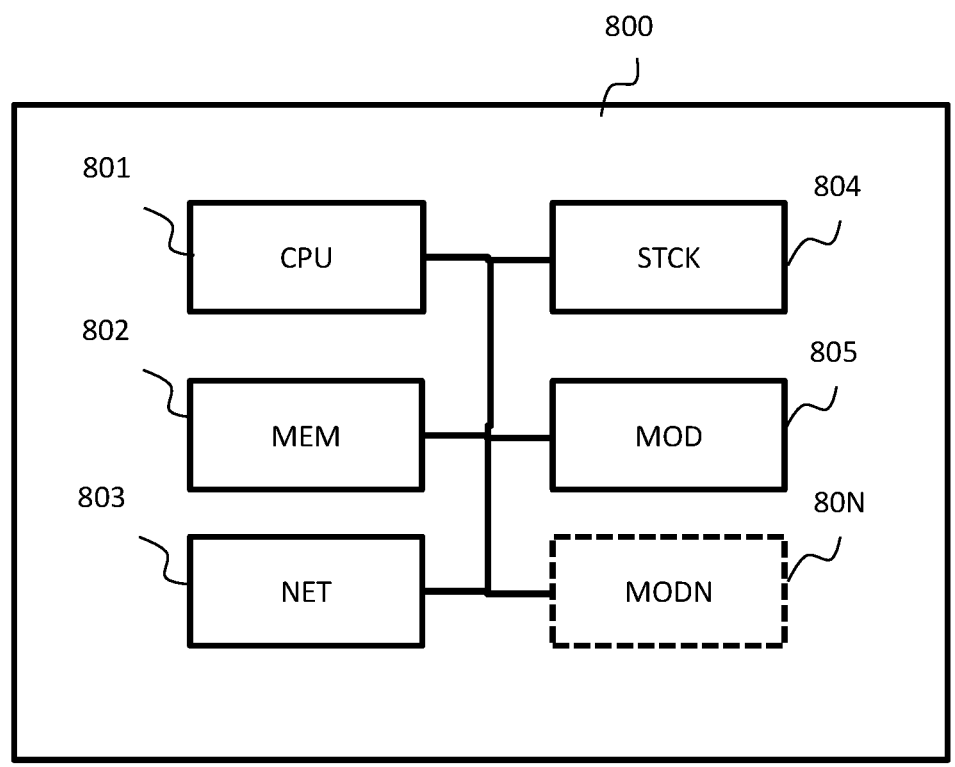
FIG. 8 illustrates schematically the hardware architecture of a gathering node of a distributed wireless communication network, the gathering node being adapted for executing all or some of the steps of the methods illustrated in FIG. 2, FIG. 4, FIG. 6 or in FIG. 7.

FIG. 8 illustrates schematically the hardware architecture of an electronic device or gathering node 800 of a wireless communication network, the electronic device or gathering node being configured to perform all or some of the steps of the method illustrated in FIG. 2, in FIG. 4, in FIG. 6 or in FIG. 7. Thus the electronic device 800 comprises, connected by a communication bus: a processor or CPU (central processing unit) 801; a memory MEM 802 of the RAM (random access memory), ROM (read only memory) and/or EPROM (erasable programmable read only memory) type, possibly a network module NET 803, for example of the Ethernet type, a storage module STCK 804 of the internal storage type and possibly a plurality of radio-frequency modules 805 to 80N in accordance with a standard of the IEEE 802.11 type. The gathering node 800 may optionally comprise one or more input/output interfaces, not shown in FIG. 8 (e.g. a keypad, a mouse, a touch pad) a webcam, etc., each being configured to display information and/or to enable a user to enter commands or data. The gathering node 800 may also comprise an energy source, not shown in FIG. 8, which may also be external to the gathering node.

The storage module STCK 804 may be of the hard disk drive (HDD) or SSD (solid-state drive) type or of the type consisting of an external storage medium reader, such as an SD (Secure Digital) card reader.

The processor CPU 801 can record data, or information, in the memory MEM 802 or in the storage module STCK 804. The processor CPU 801 can read data recorded in the memory MEM 802 or in the storage module STCK 804. These data may correspond to configuration parameters. The network module NET 503, if present, typically enables the electronic device 800 to be connected to a local network and/or the internet. Each radio-frequency module 805 to 80N enables the electronic device 800 to establish a plurality of radio-frequency interfaces in accordance with a so-called Wi-Fi standard. A radio-frequency interface may be a Wi-Fi access point, or on the other hand a so-called user radio-frequency interface enabling another electronic device to be associated with a so-called access-point radio-frequency interface. The processor CPU 801 is capable of executing instructions loaded in the memory MEM 802, for example from the storage module STCK 804. When the electronic device 800 is powered up, the processor CPU 801 is capable of reading instructions from the memory MEM 802 and executing them. These instructions form a computer program causing the implementation, by the processor CPU 801, of all or some of the methods and steps described above, particularly the method described in FIGS. 2 and 4 or the method described in FIGS. 6 and 7. Thus all or some of the methods and steps described above can be implemented in software form by the execution of a set of instructions by a programmable machine, such as a DSP (digital signal processor) or a microcontroller. All or some of the methods and steps described here can also be implemented in hardware form by a machine or a dedicated component, such as an FPGA (field-programmable gate array) or an ASIC (application-specific integrated circuit). The functions of the electronic device 800 may be integrated in a node of a wireless network in accordance with an IEEE 802.11 standard by an updating of software, that is to say for example by an updating of the microprogram (firmware) of the electronic device 800.

The invention claimed is:

1. A method for reactivating a wireless communication network in accordance with one of the IEEE 802.11 standards comprising a plurality of gathering nodes organised in a parent/child hierarchy, at least one gathering node in said communication network, referred to as the current node, comprising an access-point radio-frequency interface and a user radio-frequency interface of a so-called backhaul wireless network associated with the communication network, said access-point and user radio-frequency interfaces of said backhaul network being deactivated in sending mode, the method being executed by said current node and comprising:
   receiving a first beacon frame comprising state information indicating a reactivation; and
   a) putting in memory state information on said current node in order to indicate that a reactivation is under way;
   b) reactivating, for said current node, all of its access-point and user radio-frequency interfaces of the backhaul network;
   c) broadcasting a second beacon frame comprising state information indicating a reactivation;
   d) pairing with a parent node and, in the case where said current node has child nodes, waiting until said child nodes pair with it and checking that said child nodes are reactivated;
   updating an internal state indicating that said current node is reactivated.

2. The method according to claim 1, wherein, said current node further comprising an access-point radio-frequency interface of a so-called fronthaul wireless network associated with the communication network that is deactivated in sending mode and in reception mode, step b) further comprises a step of reactivating said access-point radio-frequency interface of said fronthaul network in sending mode and in reception mode.

3. The method according to claim 1, wherein said first beacon frame further comprises timestamp information corresponding to the time at which said reactivation was triggered, said steps a) to d) being performed solely in the case where a value of said timestamp information received is higher than a value of current timestamp information associated with said current node.

4. The method according to claim 3, wherein the step a) further comprises the putting in memory of the timestamp information received in place of the value of the current timestamp information.

5. The method according to claim 3, wherein said second beacon frame further comprises the timestamp information received.

6. The method according to claim 1, wherein, said first beacon frame further comprising a key identifying said network, said steps a) to d) are performed solely in the case where said key identifying said network of said beacon frame is identical to an identification key stored in memory of said current node.

7. The method according to claim 1, wherein said reactivation is triggered by pressing on a button of a node of said wireless communication network.

8. The method according to claim 1, wherein the method comprises, for a node of said network referred to as a receiving node:
   1) receiving a message from a node in the network, referred to as a requesting node, comprising a standby request; and
   if said receiving node is a node not having any adjacent node other than said requesting node, a node being adjacent to another node if it is accessible from this other node in a single hop:
   2) sending a message to said requesting node indicating that it accepts the standby request;
   3) receiving a message comprising a standby instruction;
   4) sending a message to said requesting node acknowledging the standby instruction;
   5) going on standby while storing in memory connection information and deactivating in sending mode its access-point and/or user radio-frequency interfaces of said backhaul network;
   otherwise:
      sending a message to said requesting node indicating that it refuses the standby request and an indication that it is an intermediate node;
      repeating the steps 1) to 5) recursively for each of the nodes adjacent to said receiving node distinct from said requesting node with said receiving node acting as a new requesting node, until all the nodes adjacent to said receiving node are put on standby;
      sending a message to said requesting node comprising a request for enabling standby;
      receiving a message comprising a standby instruction;
      sending a message to said requesting node acknowledging the standby instruction;
      going on standby while storing in memory connection information and deactivating in sending mode its access-point and/or user radio-frequency interfaces of said backhaul network.

9. The method according to claim 8, wherein going on standby further comprises deactivating its access-point radio-frequency interface of the fronthaul network in sending mode and in reception mode.

10. The method according to claim 8, wherein the message comprising the standby request comprises information indicating that it is a standby request and an identifier of the requesting node.

11. The method according to claim 10, wherein the message comprising the standby request further comprises an identification key particular to said network.

12. The method according to claim 8, wherein the message comprising the standby instruction comprises information indicating that it is a standby instruction and an identifier of the node sending the message.

13. The method according to claim 12, wherein the message comprising the standby instruction further comprises a time value defining an instant at which said receiving node must go on standby.

14. The method according to claim 12, wherein the message comprising the standby instruction further comprises the identification key particular to said network of said standby request.

15. The method according to claim 12, wherein the message comprising the standby instruction further comprises an identifier of a channel on which the radio interfaces of said receiving node must reactivate themselves.

16. The method according to claim 8, wherein the message comprising the standby-enabling request comprises information indicating that it is a standby-enabling request and an identifier of said node sending said message.

17. A gathering node of a wireless communication network in accordance with one of the IEEE 802.11 standards, said network comprising a plurality of gathering nodes organised in a parent/child hierarchy, said gathering node comprising an access-point and/or user radio-frequency interface of a so-called backhaul wireless network associated with the communication network which are deactivated in sending mode, said gathering node being configured for performing the steps of the method according to claim 1.

18. A non-transitory storage medium storing a computer program comprising instructions for implementing the method according to claim 1 when said program is executed by at least one processor of a gathering node.

* * * * *